United States Patent
Gutjahr

(10) Patent No.: US 7,546,339 B2
(45) Date of Patent: Jun. 9, 2009

(54) CLIENT-SERVER APPARATUS AND METHOD USING ALTERNATIVE-RESPONSE PROTOCOLS

(75) Inventor: Bernd Gutjahr, Ostelheim (DE)

(73) Assignee: Hewlett-Packard Development Company, L.P., Houston, TX (US)

(*) Notice: Subject to any disclaimer, the term of this patent is extended or adjusted under 35 U.S.C. 154(b) by 908 days.

(21) Appl. No.: 10/638,560

(22) Filed: Aug. 12, 2003

(65) Prior Publication Data

US 2005/0246442 A1     Nov. 3, 2005

(30) Foreign Application Priority Data

Dec. 20, 2002   (DE)  ................ 102 60 926

(51) Int. Cl.
    *G06F 15/16*    (2006.01)
(52) U.S. Cl. ....................... 709/203; 709/230
(58) Field of Classification Search ............. 709/203, 709/227, 228, 230; 715/744
See application file for complete search history.

(56) References Cited

U.S. PATENT DOCUMENTS

| | | | |
|---|---|---|---|
| 5,657,390 A | 8/1997 | Elgamal et al. | |
| 6,081,900 A | 6/2000 | Subramaniam et al. | |
| 6,212,640 B1 | 4/2001 | Abdelnur et al. | |
| 6,233,688 B1 | 5/2001 | Montenegro | |
| 6,412,009 B1 | 6/2002 | Erickson et al. | |
| 6,813,641 B2 * | 11/2004 | Fomenko et al. | 709/230 |
| 2004/0034703 A1 * | 2/2004 | Phadke | 709/224 |

FOREIGN PATENT DOCUMENTS

| | | |
|---|---|---|
| EP | 0 993 163 | 4/2000 |
| WO | 02/098108 | 12/2002 |

OTHER PUBLICATIONS

R. Khare and S. Lawrence, RFC 2817-Upgrading to TLS Within HTTP/1.1, May 200, The Internet Engineering Task Force (IETF).*
R. Fielding et al., RFC 2616-Hypertext Transfer Protocol—HTTP/1.1, Jun. 1999, The Internet Engineering Task Force (IETF).*
T. Dierks and C. Allen, RFC 2246-The TLS Protocol Version 1.0, Jan. 1999, The Internet Engineering Task Force (IETF).*

* cited by examiner

*Primary Examiner*—Dustin Nguyen
*Assistant Examiner*—Jeong S Park

(57) ABSTRACT

A client-server communication method and system establishes a connection to a server from a client using one of either a first or second request-response protocols. The first and second request-response protocols respectively have first and second sets of start-codes for initiating the establishment of the connection, a common predefined port being used for the first and second request-response protocols. The server receives a request from the client having one start-code of the first and second sets of start-codes, and determines which of the first and second request-response protocols to be used for responding to the client request based on the start-code.

23 Claims, 2 Drawing Sheets

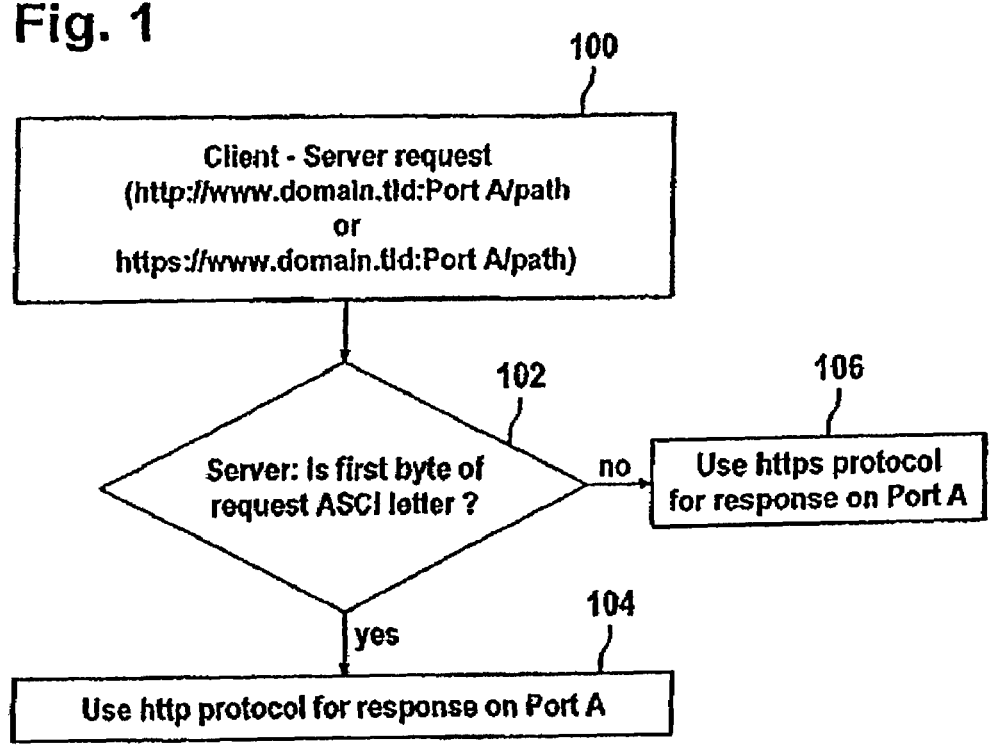

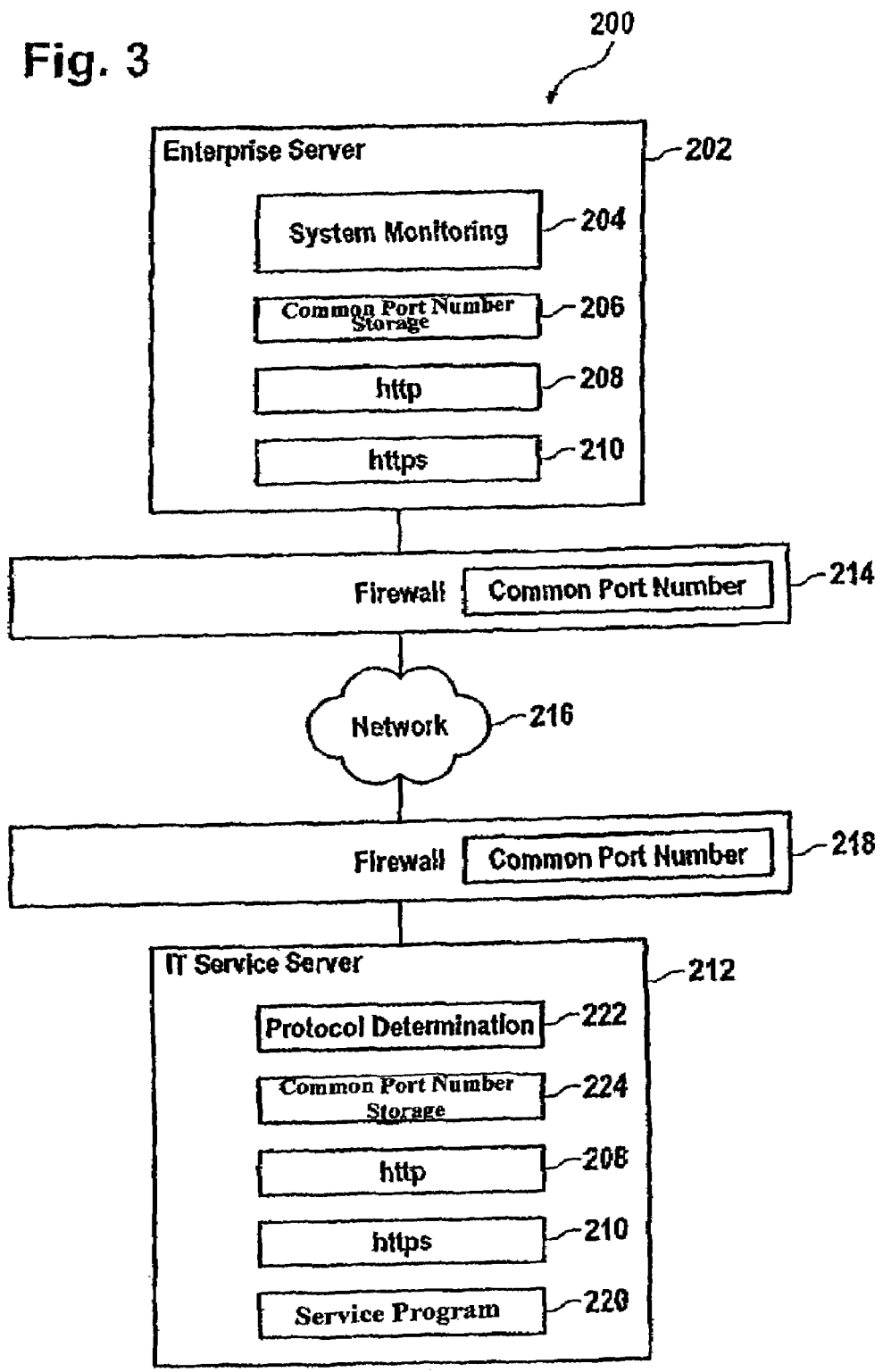

CLIENT-SERVER APPARATUS AND METHOD USING ALTERNATIVE-RESPONSE PROTOCOLS

CROSS-REFERENCE TO RELATED APPLICATION AND CLAIM OF PRIORITY

This application corresponds to German Patent Application No. 102 60 926.8, filed on Dec. 20, 2002, entitled <<Communication method>> and priority is hereby claimed under 35 USC § 119.

BACKGROUND OF THE INVENTION

1. Field of the Invention

The present invention relates generally to communications between computers, and more particularly without limitation, to a communication method and system having alternative request-response protocols such as Hyper Text Transfer Protocol (HTTP) and Hyper Text Transfer Protocol Secured (HTTPS).

2. Description of the Related Art

Hyper Text Transfer Protocol (HTTP) is an application protocol that is used for communication between an information server and a client on the Internet. Hyper Text Transfer Protocol Secured (HTTPS) is the HTTP protocol that implements the Secured Socket Layer (SSL) mechanism that provides automated encryption/decryption of messages transported via the HTTP. HTTP has communication methods that identify operations to be performed by a network application (e.g. commands that allow clients to request data from a server and send information to the server).

For example, to submit an HTTP request generated by a client application, the client contacts the HTTP server and transmits the request to the HTTP server. The request contains the communication command requested for the transaction (e.g. GET an object from the server, POST data to an object on the server) and any necessary data. The HTTP server responds to the client by sending a status of the request and/or the requested information. The connection is then terminated between the client and the HTTP server.

A client request therefore, consists of establishing a connection between the client and the HTTP server, performing the request, and terminating the connection. The HTTP server does not maintain any state about the connection once it has been terminated. HTTP is, therefore, a stateless application protocol. That is, a client can make several requests of an HTTP server, but each individual request is treated independently of any other request. The server has no recollection of any previous request.

For HTTP and HTTPS communication separate ports are required. The assignment of ports to HTTP and HTTPS communications is standardized: port 80 is the HTTP port and port 443 is the HTTPS port. Most firewalls are configured accordingly such that communication through the HTTP port 80 and the secure HTTPS port 443 is enabled.

Port 80 is the default port for HTTP communication and port 443 is the default port for HTTPS communication. However HTTP and HTTPS enable to select another port that is different from the default port setting. An arbitrary port can be selected by indicating the desired port number after the top level domain (tld) of the URL (Uniform Resource Locator) behind columns, e.g. http://www.domainname.tld:Port# or https://www.domainname.tld:Port#)

U.S. Pat. No. 6,212,640 relates to a method for resources sharing on the Internet via the HTTP. If a request submitted by an application to a server is denied, then a server that entrusts the application is identified, and the request is submitted to that server. A program code called "servlet" is implemented on that server to accept the requests submitted by a trusted application. The submitted requests are analyzed by the servlet and are forwarded to a resource server that can satisfy the requests. A response from the resource server is routed through the servlet back to the requesting application.

U.S. Pat. No. 6,412,009 relates to a method for providing a persistent HTTP tunnel. This method allows a terminal session to be supported by a real-time bi-directional persistent connection with the whole system. The bi-directional persistent connection allows interleaving of chunked data messages from the web client with chunked data messages on the web server on the persistent HTTP tunnel.

U.S. Pat. No. 6,233,688 relates to a generic naming scheme for remote access and firewall traversal in the form of a uniform resource locater. The remote access/firewall traversal procedure is made transparent to the client application and thus a wider area of client applications may be chosen for the data session with the resources beyond the firewall.

U.S. Pat. No. 6,081,900 relates to a method for secure intranet access. Web pages sent from a target server to an external client are scanned for non-secure URLs such as those containing "HTTP://" and modified to make them secure. The target server and a border server utilize various combinations of secure and non-secure caches.

U.S. Pat. No. 5,657,390 relates to a secure socket layer application program. In particular a handshake protocol and session key generation scheme is provided. When a client and a server application first establish a secure sockets connection they engage in a handshake protocol in which they negotiate security procedures, produce a master key and generate session keys to be used to encrypt and decrypt information transferred through the sockets connection.

SUMMARY OF THE INVENTION

The present invention aims to provide a client-server communication method for alternative request-response protocols, such as for secure and non-secure communication. The present invention further aims to provide a corresponding computer system and computer program product.

The present invention provides a client-server communication method supporting alternative request-response protocols, such as the HTTP and HTTPS protocols. In essence, the invention enables to utilize a common port for both protocols. This is accomplished by utilizing the respective start-codes of the protocols as an identifying feature.

For example, the first byte of a protocol request that is received by the server is used as a start-code to identify the protocol that has been used for the respective request. Such a start-code at the beginning of the request marks the start of the usage of the respective protocol in the client-server communication.

However, it is not essential that a start-code is at the beginning of the request; the start-code can also be offset from the beginning by a predefined number of bytes or it can be embedded elsewhere in the data packet of the request. In the latter case parsing of the request for identification of the start-code is required.

In essence each one of the alternative request-response protocols needs to be identifiable by means of its respective predefined start-code or a set of predefined start-codes.

Using of only a single common port for both alternative protocols is beneficial both in terms of making efficient usage of the available system resources and port number space as well as for simplifying the administration of such a computer system. In particular the administration of firewalls is greatly simplified as only a single port number needs to be configured to enable communication through the firewall by means of the alternative protocols.

In accordance with an embodiment of the present invention, the default HTTP port 80 or the default HTTPS port 443 is used as the single common port. Alternatively another port that is different from the default HTTP and HTTPS ports is used as the common port.

If the default HTTP port 80 is used as the common port the default setting does not need to be changed in case of an HTTP request. In an HTTPS request the port number 80 has to be indicated in order to change the default HTTPS port setting to the common port setting.

In accordance with a further embodiment of the present invention, the first byte of a client request received by a server is evaluated for an identifying feature of the protocol that has been used for making the request. If the first byte contains ASCI-letter codes this means that the HTTP protocol has been used; if however the first byte is "0000 0001" this means that the HTTPS protocol has been used for making the client request. The server response is made in accordance with the identified protocol.

In more general terms the present invention enables utilizing alternative request-response protocols having disjunct sets of start-codes such that from the start-code which is received by the server when a client-request is made the protocol type which has been used by the client for making the request can be identified.

In accordance with a further embodiment of the present invention, the client is a server or system monitoring application, such as HP OpenView. The application uses a secure or a non-secure request-response protocol for providing alert and/or status data to an external server depending on the kind of data to be transmitted. The present invention enables using only a single common port for both the secure and non-secure protocols.

BRIEF DESCRIPTION OF THE DRAWINGS

The following embodiments of the present invention are explained in greater detail by making reference to the drawings in which:

FIG. 1 is a flowchart of an embodiment of a method in accordance with the present invention.

FIG. 2 is an object relation diagram of an embodiment of a client-server communication method.

FIG. 3 is a block diagram of an embodiment of a computer system in accordance with the present invention.

DETAILED DESCRIPTION

FIG. 1 is a flowchart depicting a method in accordance with an embodiment of the present invention. In step 100, a request is made from a client application to a server. There are alternative secure and non-secure request-response protocols for making the client-request to the server. The non-secure request-protocol has a set of possible start-codes which is disjunct from the set of possible start-codes of the secure request-response protocol.

In the example considered here, the first byte of the client-request contains the start-code that differentiates the two protocols. For example, if the HTTP protocol is used as a non-secure protocol the first byte of the client-request is always an ASCI-letter code. When HTTPS is used as a secure protocol, the first byte of the client-request is always "0000 0001".

In addition, for making the client-request in step 100, a predefined common port for the secure and non-secure protocols needs to be selected. For example, the HTTP default port 80 or the HTTPS default port 443 can be defined to be common ports. Alternatively, an arbitrary third port can be used as the common port. In the following description, the predefined common port is designated as "port A".

The client-request has the format HTTP://www.domain.tld:portA/path when the HTTP protocol is used, or HTTPS://www.domain.tld:portA/path when the HTTPS protocol is used. When port A is HTTP port 80, the indication of port A is not required in the case of an HTTP client-request as this is the default for such a request. Further, the path-indication is optional.

In step 102, the server needs to make a determination as to the protocol that is to be used. If the first byte of the client-request received by the server is an ASCI-letter code, the HTTP protocol is used for the client-request; if the first byte is "0000 0001", the HTTPS protocol is to be used.

If the first byte of the client-request containing the respective start-code is an ASCI-letter code, the server responds to the client-request in step 104 using the HTTP protocol on the common port A; in the opposite case, i.e. the first byte being "0000 0001", the response is made in step 106 by means of the HTTPS protocol, also on the common port A.

This method is particularly advantageous as the differentiation of the secure and non-secure protocols by means of the respective start-codes enables usage of the same port A irrespective of the chosen response-request protocol. The invention therefore makes more efficient usage of the available port space. Further, system administration is simplified, as there is only a single port number for both types of protocols.

FIG. 2 is an object relation diagram depicting the communication between a client 150 and a server 152. Initially, client 150 sends a request to server 152 using the HTTP protocol or alternatively the HTTPS protocol. The request from client to server 152 is transmitted over a computer network, such as the Internet, in the form of a data packet 104 containing a sequence of bytes.

The first byte 156 of the sequence of bytes of data packet 154 contains the start-code of the protocol that has been used for the request. In the case of HTTP, the first byte is an ASCII-letter code, such as the ASCII code for "G" if the request is a GET request or the ASCII code for "P" if the request is a POST request. If the protocol, which has been used by the client 150 is the HTTPS protocol, the first byte is "0000 0001".

When server 152 receives the first data packet 154 of the request, it examines byte 156 of the data packet 154 in order to determine whether the first byte is 0000 0001 or an ASCII letter code such as the ASCII code for G or P. If the first byte 156 is an ASCII-letter code, the HTTP protocol has been used for the request; if the first byte is "0000 0001", the HTTPS protocol has been used. As a consequence, server 152 selects the same protocol that has been used by client 100 for making its response to the request by means of data packet 158.

As the identification of the protocol type is effected by means of the start-codes of the respective protocols rather than based on the port number, a common port can be used for both of the alternative protocols.

FIG. 3 is a block diagram of a computer system 200. The computer system 200 has an enterprise server 202 with a system monitoring application program 204 for system monitoring and administration. For example, application 204 is a program of the Open View program family that is commercially available from Hewlett Packard. Enterprise server 202 further has storage 206 for storing the predefined common port number for client-server communication by means of the HTTP protocol 208 and the HTTPS protocol 210.

Enterprise server 202 is coupled to IT service server 212 via firewall 214, network 216 and firewall 218. Firewalls 214 and 218 are configured to enable communication between client application 204 of enterprise server 202 and IT service server 212 on the common port. Network 216 is a computer network, such as the Internet.

IT service server 212 has a service program 220 in order to provide service to the system monitored by application 204 in response to alert and/or status data received from application 204. Further, IT service server 212 has protocol determination module 222 for determining if the HTTP protocol 208 or the HTTPS protocol 210 is used for a given client-request. Further, IT service server 212 has storage 224 for storing of the common port number.

Application 204 collects status data or generates an alert, depending on the kind of data and/or alert application 204 selects, the non-secure HTTP protocol 208 or the secure HTTPS protocol 210. Application 204 issues a client-request to IT service server 212, namely to service program 220, by means of the selected protocol through the common port number as indicated in storage 206. This client-request is transmitted through firewall 214, network 216 and firewall 218 to IT service server 212.

Protocol determination module 222 intercepts the first byte of the client-request issued from application 204 in order to determine whether the HTTP protocol 208 or the HTTPS protocol 210 has been selected by application 204. When the first byte contains ASCI-letter code, the HTTP protocol 208 had been selected; if, however, the first byte is "0000 0001", the HTTPS protocol 210 had been selected.

IT service server 212 uses the HTTP protocol 208 or alternatively, the HTTPS protocol 210, for responding to application 204 with service data provided by service program 220, depending on the protocol determination which has been made by protocol determination module 222. Again, the common port stored in storage 224 is used for sending the response.

Only a single port is required for both the secure and non-secure protocols. Accordingly, there is more efficient usage of the available port number space. Further administration of the computer system 200 and of firewalls 214 and 218 is greatly simplified, as there is only one single common port number for both types of communication protocols.

What is claimed is:

1. A client-server communication method wherein either a first request-response protocol or an alternative second request-response protocol is used by a client to establish a connection to a server, the first request-response protocol having a first set of start-codes for initiating the establishment of the connection and the second request-response protocol having a second set of start-codes for initiating the establishment of the connection, a common predefined port being used for the first and second request-response protocols, the client-server communication method comprising:

receiving a client request by the server, the client request having one start-code of one of either the first and second sets of start-codes; and determining which of the first and second request-response protocols is to be used for responding to the client request based on the start-code of the client request and establishing a connection between the client-server;

assigning a first default port to the first request-response protocol;

assigning a second default port to the second request-response protocol;

selecting a common port from one of the first and second ports, and a third port;

indicating the common port in the client request;

wherein the first request-response protocol comprises a Hyper Text Transfer Protocol(HTTP) and the second request-response protocol comprises a Hyper Text Transfer Protocol Secure(HTTPS).

2. The client-server communication method of claim 1, the first set of start-codes comprising American Standard Code for Information Interchange (ASCII)-letter codes and the second set of start-codes comprising the code 0000 0001.

3. The client-server communication method of claim 2, further comprising:

monitoring by an application of the client-server connection in response to alert and/or status data receive from the application.

4. The client-server communication method of claim 3, further comprising:

determining whether the HTTP or HTTPS protocol is being used.

5. The client-server communication method of claim 4, further comprising:

issuing a client request to service the client-server connection.

6. The client-server communication method of claim 1, further comprising:

monitoring by an application of the client-server connection in response to alert and/or status data receive from the application.

7. The client-server communication method of claim 6, further comprising:

determining whether the HTTP or HTTPS protocol is being used.

8. The client-server communication method of claim 7, further comprising:

issuing a client request to service the client-server connection.

9. A client-server communication method wherein either a first request-response protocol or an alternative second request-response protocol is used by a client to establish a connection to a server, the first request-response protocol having a first set of start-codes for initiating the establishment of the connection and the second request-response protocol having a second set of start-codes for initiating the establishment of the connection, a common predefined port being used for the first and second request-response protocols, the client-server communication method comprising:

sending a client request to the server on the common port, the client request having one of the first and second sets of start-codes; and receiving a server response on the common port in accordance with the request-response protocol identified by the one start-code;

indicating a common port number in the client request; and establishing a connection between the client and server;

wherein the first request-response protocol comprises an HTTP protocol and the second request-response protocol comprises an HTTPS protocol.

10. The client-server communication method of claim 9, further comprising:

assigning a first default port to the first request-response protocol; and assigning a second default port to the second request-response protocol;

wherein the common port is selected from one of the first and second ports, or a third port.

11. The client-server communication method of claim 9, wherein the first set of start-codes comprise ASCII-letter codes and the second set of start-codes comprise a code 0000 0001.

12. A client computer system comprising:
a first interface arranged to send a client request using one of either a first request-response protocol or an alternative second request-response protocol to establish a connection to a server, the first request-response protocol having a first set of start-codes for initiating the establishment of the connection and the second request-response protocol having a second set of start-codes for initiating the establishment of the connection;
a storage arrangement arranged to store a common predefined port for the first and second request-response protocols;
a second interface arranged to receive a response from the server on the common port using the request-response protocol of the first and second request-response protocols corresponding to the start-code of the first and second sets of start-codes used for the client request;
wherein the client request includes an indication of the common port; and
wherein the first request-response protocol comprises an HTTP protocol and the second request-response protocol comprises an HTTPS protocol.

13. The client computer system of claim 12, further comprising a system monitor arranged to generate a client request to communicate an alert and/or status to the server.

14. A server computer system comprising:
a first interface arranged to receive of a client request, the first interface being arranged to determine if a first request-response protocol or an alternative second request-response protocol is contained within the client request, the first request-response protocol having a first set of start-codes for initiating an establishment of a connection and the second request-response protocol having a second set of start-codes for initiating the establishment of the connection, whereby the determination of the protocol is made based on a start-code of the client request;
a storage arrangement arranged to store a common predefined port for the first and second request-response protocols; and
a second interface arranged to send a response to the client on the common port using the request-response protocol of the first and second request-response protocols determined to be in the client request and establishing a connection between the client-server;
wherein the client request includes the common predefined port; and
wherein the first request-response protocol comprises an HTTP protocol and the second request-response protocol comprises an HTTPS protocol.

15. A computer system having a client computer system and a server computer system, the client computer system comprising:
a first interface arranged to send the client request using one of either the first request-response protocol or the alternative second request-response protocol to establish a connection to a server, the first request-response protocol having the first set of start-codes for initiating the establishment of the connection and the second request-response protocol having the second set of start-codes for initiating the establishment of the connection;
a storage arrangement arranged to store the common predefined port for the first and second request-response protocols; and
a second interface arranged to receive the response from the server on the common port using the request-response protocol of the first and second request-response protocols corresponding to the start-code of the first and second sets of start-codes which used for the client request; and
the server computer system comprising:
a third interface arranged to receive a client request, and to determine if a first request-response protocol or an alternative second request-response protocol is contained within the client request, the first request-response protocol having a first set of start-codes for initiating the establishment of the connection and the second request-response protocol having a second set of start-codes for initiating the establishment of the connection, wherein the determination of the protocol is based on the start-code of the client request;
an additional storage arrangement arranged to store a common predefined port for the first and second request-response protocols; and
a fourth interface arranged to send a response to the client on the common port using the request-response protocol of the first and second request-response protocols determined by the third interface and establishing a connection between the client-server;
wherein the client request includes the common predefined port; and
wherein the first request-response protocol comprises an HTTP protocol and the second request-response protocol comprises an HTTPS protocol.

16. The computer system of claim 15, further comprising at least one firewall arranged to enable communication through the common port.

17. A program storage device, readable by a machine, tangibly embodying a program of instructions executable by the machine to perform a client-server communication method, wherein one of either a first request-response protocol or an alternative second request-response protocol is used by a client to establish a connection to a server, the first request-response protocol having a first set of start-codes for initiating the establishment of the connection and the second request-response protocol having a second set of start-codes for initiating the establishment of the connection, a common predefined port being used for the first and second request-response protocols, the client-server communication method comprising:
receiving a client request, the client request having one start-code of the first and second sets of start-codes and a common predefined port; and
determining the request-response protocol of the first and second request-response protocols to be used for responding to the client request based on the start-code contained within the client request and establishing a connection between the client-server;
wherein the first request-response protocol comprises an HTTP protocol and the second request-response protocol comprises an HTTPS protocol.

18. A program storage device, readable by a machine, tangibly embodying a program of instructions executable by the machine to perform a client-server communication method, wherein one of either a first request-response protocol or an alternative second request-response protocol is used by a client to establish a connection to a server, the first request-response protocol having a first set of start-codes for initiating the establishment of the connection and the second request-response protocol having a second set of start-codes for initiating the establishment of the connection, a common predefined port being used for the first and second request-response protocols, the client-server communication method comprising:

sending a client request to the server on the common port, the client request having one start-code of the first and second sets of start-codes; and receiving a server response on the common port in accordance with the request-response protocol identified by one start-code contained within the client request and establishing a connection between the client-server;

wherein the client request includes the common predefined port; and wherein the first request-response protocol comprises an HTTP protocol and the second request-response protocol comprises an HTTPS protocol.

19. A data processing system supporting alternative first and second request-response protocols, wherein usage of the first request-response protocol is identifiable by a first code of the request and usage of the second request-response protocol is identifiable by a second code of a request, the data processing system comprising a program storage device, the program storage device including:

an interface arranged to receive a request;

a protocol determination arrangement arranged to determine which one of the first and second request-response protocols is to be used for a response to the request, the protocol determination arrangement being adapted to perform the protocol determination on the basis of which of the first or second code has been received as part of the request; and a common port arranged to communicate using the first and second request-response protocols and establishing a connection between the client-server, the common port received as part of the request;

wherein the first request-response protocol comprises an HTTP protocol and the second request-response protocol comprises an HTTPS protocol.

20. The data processing system of claim 19, further comprising a firewall arranged to enable communication via the common port.

21. The data processing system of claim 19, further comprising a service data provider arranged to provide service data in response to the request, the service data being transmitted to a requester as part of the response.

22. A client-server communication method comprising:

selecting of a communication protocol to one of either first and second request-response protocols, the communication protocol being selected by the client, the first request-response protocol being identifiable by a first code and the second request-response protocol being identifiable by a second code;

sending a request to the server using the selected protocol via a common port arranged to couple the server to a client;

determining whether the first or the second code is contained within the request by the server; and using the first request-response protocol for the server response if the first code is contained within the request and using the second request-response protocol for the server response if the second code is contained within the request and establishing a connection between the client-server;

wherein the common port is selected by the client;

wherein the first request-response protocol comprises an HTTP protocol and the second request-response protocol comprises an HTTPS protocol.

23. A client-server communication method of determining a protocol in a data processing system supporting alternative first and second request-response protocols, wherein usage of the first request-response protocol is identifiable by a first code of a request and usage of the second request-response protocol is identifiable by a second code of the request, the data processing system comprising:

an interface arranged to receive a request; and a common port arranged to communicate using the first and second request-response protocols, wherein the common port is part of the request;

the method comprising determining which one of the first and second request-response protocols is to be used for a response to the request on the basis of which of the first or second code has been received as part of the request and establishing a connection between the client-server;

wherein the first request-response protocol comprises an HTTP protocol and the second request-response protocol comprises an HTTPS protocol.

* * * * *